Patented Nov. 2, 1943

2,333,526

UNITED STATES PATENT OFFICE 2,333,526

GLYCININ DERIVATIVE

Russell O. Denyes, Pittsburgh, Pa., assignor to Tubize Chatillon Corporation, a corporation of Delaware No Drawing. Application May 7, 1940,
Serial No. 333,773

20 Claims. (Cl. 260—112)

This invention relates to protein derivatives and more particularly to derivatives of glycinin, the protein of soybeans. The invention aims generally to provide an improved protein derivative and method of making the same. More particularly, the invention contemplates the provision of a glycinin derivative adapted to be used in the production of synthetic fibers, films, plastics, coating and sizing compositions, textile finishing agents or compositions, and the like, as well as the method of making the same.

A wide variety of proteins are known to be soluble to a greater or lesser extent in alkaline solutions, the degree of solubility being dependent upon the nature of the protein, the method used in its isolation and its previous history, and the reagent used to render the solution alkaline. I have discovered that the solubility in dilute alkaline solution of some proteins can be greatly increased if the protein is treated with sodium formaldehyde sulfoxylate. Such solutions, I find, have quite different viscosities from alkaline solutions of the original protein, show somewhat less tendency toward gelation, are more resistant to putrefaction, and exhibit a variety of other characteristics quite different from the usual alkaline solutions of proteins.

Certain proteins, as for example soybean protein, become partially or completely denatured when subjected to a heat treatment or when treated with certain organic solvents such as alcohol, and their solubility in inorganic bases, as for example sodium hydroxide, is decreased markedly. It is, however, often desirable to obtain relatively concentrated solutions of such denatured proteins because of their peculiar adaptability for a variety of uses. I have discovered that the treatment of such partially or even completely denatured proteins with sodium formaldehyde sulfoxylate greatly increases their solubility in dilute alkaline solutions.

The present invention is based on the foregoing discoveries and contemplates the production of a new article of manufacture composed of or containing the product of the reaction in an alkaline solution of soybean protein and an hydroxyalkyl sulfoxylate. Another feature of the invention is the production, as a new article of manufacture, of the product precipitated by acidifying the alkaline solution containing the reaction product of soybean protein and an hydroxyalkyl sulfoxylate. The precipitated product is much less soluble in alkaline solutions than is the original protein. This fact is of considerable importance when the protein solution (i. e. dispersion in alkaline solution of the primary reaction product of the invention) is to be used for such purposes as the production of synthetic films or filaments, as paper sizing and/or coating, and as a textile finishing agent, since for these purposes it is desirable that the precipitated product should have the minimum solubility possible. The invention also contemplates methods of preparing the new products of the invention.

The protein material from soybeans is a mixture of glycinin, albumin and a water-soluble protein precipitated by copper hydroxide and potassium hydroxide; but in as much as over 90 percent is the protein glycinin, the soybean protein may be considered as somewhat impure glycinin, and throughout this specification and the appended claims glycinin is to be understood as defining soybean protein and equivalent protein materials. Depending upon the properties desired in the products of the invention, the glycinin may be undenatured or partially or completely denatured or coagulated by heat or certain organic solvents such as alcohol. It is my present belief that the reaction between glycinin and sodium formaldehype sulfoxylate may be represented as follows:

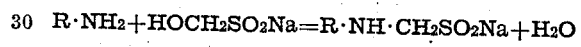

Thus, the primary new product of the invention may be considered a hydroxyalkyl sulfoxylate derivative of glycinin, such for example as "sodium glycinin methylsulfoxylate" where the hydroxyalkyl sulfoxylate is sodium formaldehyde sulfoxylate. The corresponding secondary or precipitated product of the invention may be considered "precipitated glycinin methyl sulfoxylate."

The water-soluble hydroxymethyl sulfoxylates, of which sodium formaldehyde sulfoxylate and zinc formaldehyde sulfoxylate are examples, are particularly available and satisfactory hydroxyalkyl sulfoxylates for the practice of the invention. All of the alkali-metal salts (including ammonium) of formaldehyde sulfoxylic acid have a satisfactory dispersing action on soybean protein. The sodium, potassium and lithium salts have essentially the same dispersing action and can be used interchangeably without affecting to any great extent the properties of the resulting dispersion, while the ammonium salt gives a dispersion of somewhat different appearance and properties. Zinc formaldehyde sulfoxylate also gives excellent results. Among other hydroxyalkyl sulfoxylates and salts of hydroxyalkyl sulfoxylic acid which have been used in the practice of the invention may be mentioned—sodium acetone sulfoxylate, sodium acetaldehyde sulfoxylate, sodium furfuraldehyde sulfoxylate and sodium benzaldehyde sulfoxylate. Any water-soluble formaldehyde (or other aldehyde or ketone) sulfoxylate may be substituted for the sodium salt of the hydroxyalkyl sulfoxylic acids hereinbefore mentioned; the potassium, lithium, ammonium and zinc salts being especially available.

A wide variety of agents may be employed to impart the contemplated alkalinity to the solution in which the dispersion of the soybean protein is promoted by the hydroxy-alkyl sulfoxylate. Sodium hydroxide is ordinarily the most available and satisfactory agent; but ammonium hydroxide, potassium hydroxide, calcium hydroxide, methyl amine, ethylene diamine and triethanolamine may be used. In general, the contemplated alkalinity of the solution may be obtained with alkali-metal and alkaline-earth metal hydroxides, and various primary, secondary and tertiary aliphatic amines and quarternary ammonium hydroxides. Obviously, however, the physical properties of the resulting reaction products differ according to the particular alkalizing agent used.

The method of the invention consists essentially in treating the soybean protein (glycinin) with an hydroxyalkyl sulfoxylate and an alkaline solution. A wide variety of procedures are available in carrying out the method. Among the possible variations in procedure, may be mentioned the following, merely as illustrative and with the understanding that here, as well as elsewhere throughout this specification, sodium formaldehyde sulfoxylate is representative of any appropriate salt of an hydroxyalkyl sulfoxylic acid and sodium hydroxide is representative of any appropriate alkalizing agent:

(1) Sodium hydroxide is added to a suspension of soybean protein in an aqueous solution of sodium formaldehyde sulfoxylate;

(2) Sodium formaldehyde sulfoxylate is added to a dilute alkaline solution or suspension of soybean protein;

(3) An alkaline solution of sodium formaldehyde sulfoxylate is added to an aqueous suspension of soybean protein; and (4) Soybean protein is added to an alkaline solution of sodium formaldehyde sulfoxylate.

Where the procedure involves first the treatment of the protein with an aqueous solution of sodium formaldehyde sulfoxylate and then the addition of sodium hydroxide, certain limitations must be observed. Thus, while the first step, the treatment of the protein with sodium formaldehyde sulfoxylate, may be carried out over a very wide range of acidity, there is a minimum pH at or above which satisfactory results can be obtained. The minimum pH is dependent upon the temperature and length of time employed in this step since the reagent as well as the product of the reaction between the reagent and the protein decompose in the presence of acid. The amount of decomposition taking place is dependent upon the acidity and temperature of the suspension, and the length of time that the reagent and/or the product of the reaction between the protein and the reagent are in contact with the acid. For example, the minimum pH for this first step in the preparation of a satisfactory dispersion using soybean protein is approximately pH 2.5 when the time employed is 1 hour and the temperature 25° C. Similarly, the minimum pH is approximately 3.5 when the temperature is 40° C., and approximately 4.5 when the temperature is maintained at 60° C. for 1 hour. Any pH above this minimum may be used.

Dispersions or solutions of the product of the reaction between soybean protein and sodium formaldehyde sulfoxylate may be prepared by dissolving or partially dissolving the protein in an alkaline solution and then adding sodium formaldehyde sulfoxylate. While this procedure gives very satisfactory results in the case of more dilute solutions, the tendency of alkali to swell the protein or to form a gel when high concentrations of protein are used limits the usefulness of this method when solutions of very high viscosities are required.

It is also possible to prepare satisfactory dispersions or solutions of the protein derivative by the addition of an alkaline solution of sodium formaldehyde sulfoxylate to an aqueous suspension of the protein, or by adding the protein to an alkaline solution of sodium formaldehyde sulfoxylate. These procedures are subject to fewer limitations than either of those previously described.

The quantity of sodium formaldehyde sulfoxylate required for preparing suitable dispersions or solutions of the protein derivative may be varied over wide limits depending upon the concentration of the protein and the viscosity required. In general, however, it is desirable to use a quantity of reagent exceeding 10 percent of the weight of the protein. Smaller quantities, however, may be used in some cases.

The quantity of alkali to be used in the preparation of suitable dispersions or solutions of the protein derivative is dependent upon a great many factors such as the properties of the particular protein used, the previous history of the protein, the concentration of the protein required in the final solution, the use to which the solution is to be put, etc. It is usually desirable, however, to add sufficient alkali so that the final solution shall have a pH of 8 or above. For some purposes, however, a lower pH may be satisfactory and desirable.

By employing the procedures hereinbefore described, it is possible to obtain not only solutions of undenatured proteins which show unusual properties, but it is also possible to disperse proteins which have been rendered largely insoluble in dilute alkaline solutions as a result of prolonged treatment with organic solvents such as alcohol, etc., heating in aqueous or nonaqueous media, heating at high temperatures in an autoclave, or heating in a hot-air oven. Because of the properties of denatured proteins, their solutions are more suitable for certain purposes than those of the corresponding undenatured proteins.

In order to describe the invention more fully, the following examples are given. These examples illustrate certain of the ways in which the general principles of the invention may be applied, and are not to be construed as limiting the scope or application of the invention.

*Example I*

Air-dry soybean protein (180 g.) is suspended in water (820 g.) and stirred for 15 minutes. Sodium formaldehyde sulfoxylate (60 g.) is added and the stirring continued for 1 hour. Then sodium hydroxide (11 cc.; 50% NaOH) is introduced and the stirring continued for 1 hour. A clear, dark green, viscous solution is obtained. Solutions having higher viscosities may be obtained by increasing the quantity of protein used, while solutions having lower viscosities may be obtained either by decreasing the quantity of protein used, or by diluting the more viscous solutions with water.

Example II

Air-dry soybean protein (130 g.) is suspended in water (870 g.) and stirred for 15 minutes. Then sodium hydroxide (10 cc.; 50% NaOH) is added and the stirring continued for 1 hour. Sodium formaldehyde sulfoxylate (50 g.) is then added and the stirring continued for 1 hour. The resulting solution is clear and dark green in color.

Example III

Air-dry soybean protein (180 g.) is suspended in water (620 g.) and stirred for 15 minutes. Then a solution of sodium hydroxide (11 cc.; 50% NaOH) and sodium formaldehyde sulfoxylate (60 g.) in water (200 g.) is added slowly and the stirring continued for 2 hours. A clear, dark green, viscous solution resulted.

Example IV

Air-dry soybean protein (200 g.) is added slowly with vigorous stirring to a solution of sodium hydroxide (11 cc.; 50% NaOH) and sodium formaldehyde sulfoxylate (50 g.) in water (850 g.). The stirring is continued for 3 hours after all of the protein is added. A dark green, viscous solution is obtained.

Example V

Air-dry soybean protein (150 g.; 7% moisture) is suspended in water (850 g.) and stirred vigorously as the temperature is raised to the boiling point, and maintained at this temperature for 60 minutes. Sufficient ice is added to replace the water lost by evaporation, and the suspension of the now denatured protein is cooled to 25° C. Then sodium formaldehyde sulfoxylate (50 g.) is added and the suspension stirred for 1 hour. At the end of this time, sodium hydroxide (11 cc.; 50% NaOH) is introduced and the stirring continued for 3 hours. A clear, viscous solution results. The viscosities of solutions prepared from protein denatured by heating in water may be varied considerably by varying the concentration of protein, the time and temperature of heating, the concentration of sodium hydroxide, and the concentration of the sodium formaldehyde sulfoxylate. These solutions may be diluted with water in order to lower the viscosity.

Example VI

Air-dry soybean protein (150 g.) is denatured by heating in a hot-air oven at 105° C. for 16 hours. It is then suspended in water (850 g.) containing sodium formaldehyde sulfoxylate (50 g.) and stirred for one hour. Then sodium hydroxide (11 cc.; 50% NaOH) is added, and the stirring continued for 3 hours. A clear, viscous solution results. The viscosities of such solutions can be varied over wide limits by making suitable changes in the concentration of the protein, the length of time of heating, the temperature, the concentration of sodium hydroxide, and the concentration of sodium formaldehyde sulfoxylate. It is also possible to dilute such solutions if lower viscosities are desired.

Example VII

Air-dry soybean protein (150 g.) is denatured by heating in an autoclave at 243° F. and a steam pressure of 15-16 lbs. for 15 minutes. It is then suspended in water (850 g.) containing sodium formaldehyde sulfoxylate (50 g.) and stirred for one hour. Then sodium hydroxide (11 cc.; 50% NaOH) is added and the stirring continued for 3 hours. A clear, viscous solution results. The viscosities of such solutions can be varied over wide limits by making suitable changes in the concentration of the protein, the length of time of heating, the temperature, the concentration of sodium hydroxide, and the concentration of sodium formaldehyde sulfoxylate. It is also possible to dilute such solutions if lower viscosities are desired.

Example VIII

Air-dry cottonseed protein (180 g.; 7% moisture) is suspended in distilled water (820 g.) containing sodium formaldehyde sulfoxylate (60 g.) and stirred for one hour. Then sodium hydroxide (10.5 cc.; 50% NaOH) is added and the stirring continued for one hour. A clear solution results.

Example IX

Air-dry soybean protein (320 g.) was suspended in distilled water (1400 g.) and stirred vigorously as the temperature was raised to 100° C. (30 minutes) and maintained at 99-100° C. for 30 minutes. Water was added from time to time to replace that lost by evaporation. Sufficient ice was then added to increase the total weight of the suspension to 2,000 g., after which it was cooled to 25° C., in an ice-bath. Sodium formaldehyde sulfoxylate (100 g.) was added and the suspension stirred for 1 hour. Sodium hydroxide (22 cc.; 50% NaOH) was then added and the stirring continued for 3 hours. The final addition was (2 g.) of "Olate Flake," an olive oil soap containing a high percentage of sodium oleate manufactured by the Procter and Gamble Company, and the stirring continued for 1 hour. The solution was then filtered, and aged for 16 hours at 21° C. The viscosity of the solution (at time of spinning) was 341 sec. at 45° C. (using a Vercelli tube calibrated so that castor oil at 20° C. flowed between the two marks in 210 sec.). Spinning of the solution was carried out on an experimental machine of the type commonly used in spinning viscose rayon by the spool or bobbin method. The spin bath contained approximately 1 per cent sulfuric acid, 20 per cent sodium sulfate, and 10 per cent glucose, and was maintained at 55-56° C. The yarn was spun vertically through 15 inches of spin bath at a take-up speed of 80 meters per minute. The yarn was treated with formaldehyde-sodium chloride solutions, washed with filtered distilled water, and dried at room temperature in a current of air, and possessed the following characteristics: titer, 139 deniers; dry strength, 0.7 grams per denier; dry elongation, 5.2%.

Example X

Air-dry soybean protein (148 g.) was suspended in distilled water (700 g.) and the suspension stirred vigorously as the temperature was raised to 100° C. (30 minutes) and maintained at 99-100° C. for 30 minutes. Additional water was added from time to time to replace that lost by evaporation. The weight of the solution was then adjusted to 1,000 g. by the addition of crushed ice, and the mixture cooled rapidly to 25° C. in an ice bath. Sodium formaldehyde sulfoxylate (33.5 g.) and zinc formaldehyde sulfoxylate (13.5 g.) were added and the suspension stirred for 1 hour. Sufficient sodium hydroxide was added to raise the pH of the suspension to approximately 10.5, and stirring was continued for four hours. The solution was then allowed to age for 18 hours at 21° C. under partial vacuum. The viscosity of this solution (at time of spinning) was 107 sec. at 55° C. Filtering, aging, spinning and treatment of the yarn were carried out substantially as described in the preceding example. The yarn possessed the following characteristics: titer, 168 deniers; dry strength, 0.5 gram per denier; dry elongation, 7.75%.

Replacement of some sodium formaldehyde sulfoxylate by zinc formaldehyde sulfoxylate produces a decided increase in the viscosity of the solution, changes its color from dark green to straw color, facilitates the starting of the spinning operation, and gives a lighter colored and softer yarn. On the other hand, the tensile strength of the yarn decreases with increased concentration of zinc until a minimum is reached at a zinc to sodium ratio of approximately 3 to 17. Further increase in the zinc-sodium ratio does not affect the tensile strength of the yarn.

Dispersions or solutions of the product of the reaction in an alkaline solution of glycinin and an hydroxyalkyl sulfoxylate may be employed for making films, ribbons, tapes and the like. The product is also useful in the preparation of sizing and coating compositions for paper, fabric, etc., and of textile-finishing agents. The precipitated glycinin hydroxyalkyl sulfoxylates of the invention are thermoplastic and may be molded under heat and pressure.

I claim:

1. As a new product, an aqueous alkaline solution of the product of the reaction in an aqueous alkaline solution of glycinin and an hydroxyalkyl sulfoxylate.

2. As a new product, an aqueous alkaline solution of the product of the reaction in an aqueous alkaline solution of glycinin and an alkali-metal hydroxyalkyl sulfoxylate.

3. As a new product, an aqueous alkaline solution of the product of the reaction in an aqueous alkaline solution of glycinin and a water-soluble salt of a hydroxymethyl sulfoxylic acid.

4. As a new product, an aqueous alkaline solution of the product of the reaction in an aqueous alkaline solution of glycinin and sodium formaldehyde sulfoxylate.

5. As a new product, an aqueous alkaline solution of the product of the reaction in an aqueous alkaline solution of glycinin and zinc formaldehyde sulfoxylate.

6. As a new article of manufacture, the product precipitated by acidifying an aqueous alkaline solution of the reaction product of glycinin and an hydroxyalkyl sulfoxylate.

7. As a new article of manufacture, the product precipitated by acidifying an aqueous alkaline solution of the reaction product of glycinin and an alkali-metal hydroxyalkyl sulfoxylate.

8. As a new article of manufacture, the product precipitated by acidifying an aqueous alkaline solution of the reaction product of glycinin and a water-soluble salt of a hydroxymethyl sulfoxylic acid.

9. As a new article of manufacture, the product precipitated by acidifying an aqueous alkaline solution of the reaction product of glycinin and the zinc salt of an hydroxyalkyl sulfoxylic acid.

10. As a new article of manufacture, the product precipitated by acidifying an aqueous alkaline solution of the reaction product of glycinin and sodium formaldehyde sulfoxylate.

11. As a new product, an aqueous alkaline solution of the product of the reaction in an aqueous alkaline solution of glycinin at least partially denatured and an hydroxyalkyl sulfoxylate.

12. As a new product, an aqueous alkaline solution of the product of the reaction in an aqueous alkaline solution of glycinin at least partially denatured and an alkali-metal hydroxyalkyl sulfoxylate.

13. As a new product, an aqueous alkaline solution of the product of the reaction in an aqueous alkaline solution of glycinin at least partially denatured and sodium formaldehyde sulfoxylate.

14. As a new product, an aqueous alkaline solution of the product of the reaction in an aqueous alkaline solution of glycinin at least partially denatured and the zinc salt of an hydroxyalkyl sulfoxylic acid.

15. The method of forming a solution of a derivative of glycinin which comprises dispersing glycinin in an alkaline solution in the presence of a water-soluble salt of an hydroxyalkyl sulfoxylic acid.

16. The method of forming a solution of a derivative of glycinin which comprises dispersing glycinin in an alkaline solution in the presence of an alkali-metal hydroxymethyl sulfoxylate.

17. The method of producing a glycinin derivative which comprises dispersing glycinin in an alkaline solution in the presence of an hydroxyalkyl sulfoxylate, and acidifying the resulting dispersion to precipitate the glycinin derivative.

18. The method of producing a glycinin derivative which comprises dispersing glycinin in an alkaline solution in the presence of an alkali-metal hydroxy methyl sulfoxylate, and acidifying the resulting dispersion to precipitate the glycinin derivative.

19. The method of producing a glycinin derivative which comprises at least partially denaturing glycinin, dispersing the at least partially denatured glycinin in an alkaline solution in the presence of an hydroxyalkyl sulfoxylate, and acidifying the resulting dispersion to precipitate the glycinin derivative.

20. The method of producing a glycinin derivative which comprises at least partially denaturing glycinin, dispersing the at least partially denatured glycinin in an alkaline solution in the presence of an alkali-metal hydroxy methyl sulfoxylate, and acidifying the resulting dispersion to precipitate the glycinin derivative.

RUSSELL O. DENYES.